United States Patent [19]

Jalaguier

[11] 4,086,014
[45] Apr. 25, 1978

[54] QUICK LOCKING AND UNLOCKING CONNECTOR

[75] Inventor: Jean-Pierre Jalaguier, Marignane, France

[73] Assignee: Societe Nationale Industrielle Aerospatiale, Paris, France

[21] Appl. No.: 689,050

[22] Filed: May 24, 1976

[51] Int. Cl.² .............................................. B25G 3/00
[52] U.S. Cl. ................................. 403/317; 24/211 R; 403/161
[58] Field of Search ............... 403/316, 317, 319, 324, 403/376, 388, 355, 49, 161, 315, 325, 326, 328, 329; 24/211 R, 213 C, 215, 110; 85/8.3, 5 CP

[56] References Cited

U.S. PATENT DOCUMENTS

| 780,945 | 1/1905 | Fenton | 403/316 X |
|---|---|---|---|
| 1,169,693 | 1/1916 | Swedlung | 24/211 R |
| 1,259,704 | 3/1918 | Zeckendorf | 403/357 |
| 1,563,442 | 12/1925 | Scheben | 403/325 |
| 2,405,400 | 8/1946 | Butterfield | 85/8.3 X |
| 2,686,576 | 8/1954 | Bachman et al. | 85/8.3 X |
| 2,706,774 | 4/1955 | Bowman | 403/357 X |
| 3,065,003 | 11/1962 | Whitehouse | 403/319 X |
| 3,065,011 | 11/1962 | DePew | 403/329 |
| 3,125,396 | 3/1964 | Bertram | 24/211 R X |
| 3,183,586 | 5/1965 | Sellers | 403/408 X |
| 3,347,485 | 10/1967 | Bundschuh | 403/357 X |
| 3,817,005 | 6/1974 | Rannefeld | 403/329 X |
| 3,897,162 | 7/1975 | Havark | 403/316 X |

FOREIGN PATENT DOCUMENTS 287,753   3/1928   United Kingdom .............. 403/319

Primary Examiner—Wayne L. Shedd

[57] ABSTRACT

A tubular body in which is inserted an operating and locking member formed by a resilient metal wire having a pull ring and two legs extending therefrom. The legs end each with a lock catch extending towards the outside which is radially movable alternatively to hook over the end of the body or be retracted inwardly for removal.

8 Claims, 5 Drawing Figures

U.S. Patent
April 25, 1978
4,086,014
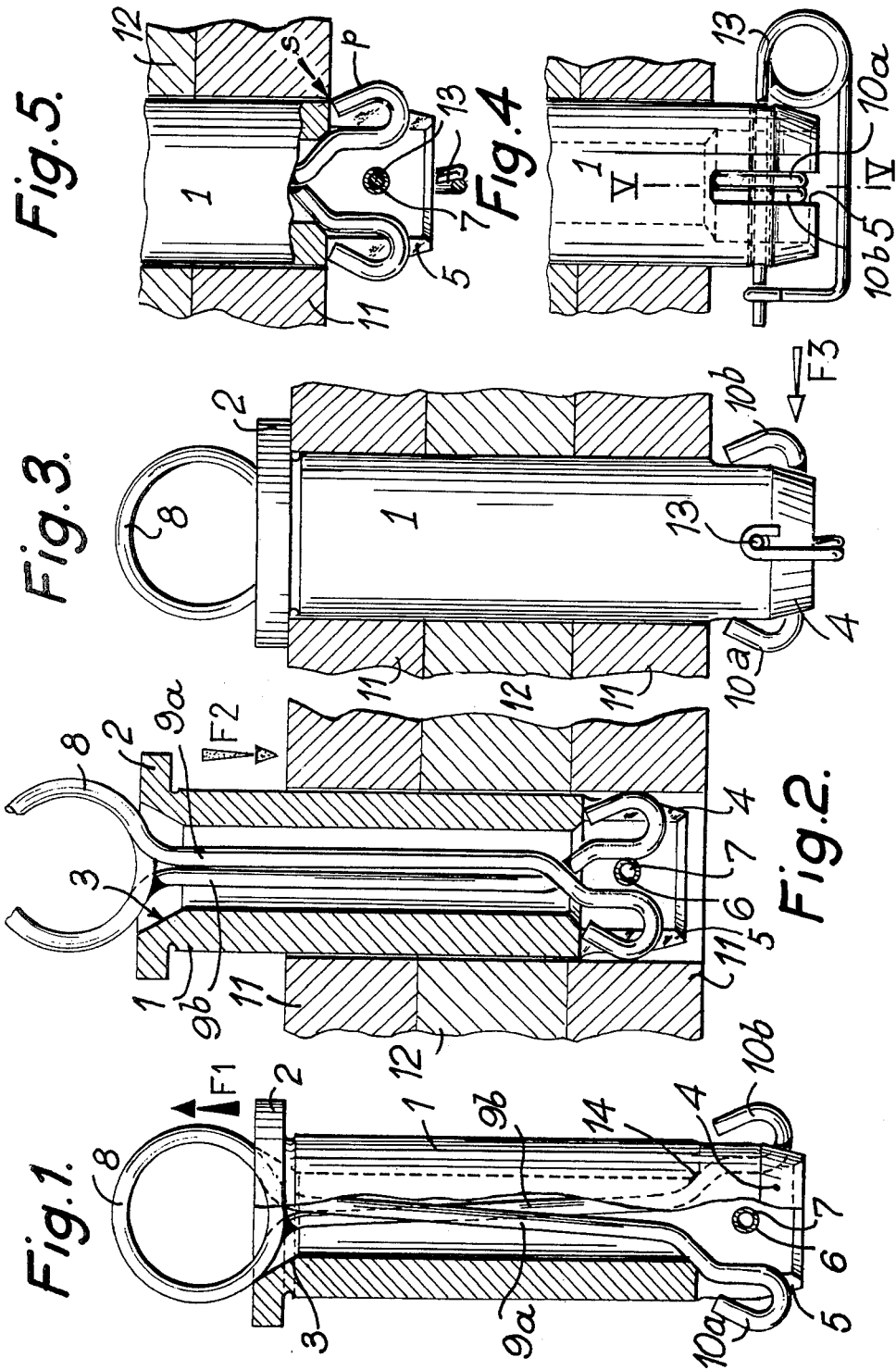

QUICK LOCKING AND UNLOCKING CONNECTOR

This invention is applicable to the assembly of all mechanical parts.

The present invention relates to hand operable screwless connectors, used mainly in the field of mechanics; and, more particularly it relates to a simplified quick locking and unlocking connector.

There is known in the art, devices of the pin type which allow the assembly of at least two parts, comprising a locking system operated by a mobile push piece located inside the pin. Broadly, these devices use as the push piece, a central metallic rod cloesely fitting inside the pin body having at one end a machined portion defining one or more conical surfaces and at the other end either a return device, a blocking device, or the unitary assembly of the return and blocking devices.

The locking system of these devices sometimes consists of two balls placed at one end of the pin and located along a diameter. These balls are lodged within the wall of the pin and are pushed towards the outside by a portion of the central rod end formed with the conical surfaces, such surfaces thereby acting as cams.

In order to limit the lateral movement of the balls, it is necessary to provide a stop which allows the balls to come out only sufficiently so that the parts to join are blocked in their position and which allows a return movement without jamming. That is the pin is allowed to be removed when the balls are back in their first position.

In another locking system, the device can be formed with a metal wire shaped as a "U" in order to provide at one end of the pin a resilient system comprising two deformable and retractable catches. In this system, the catches can be moved due to the presence of two holes formed opposite of one diameter at one end of the pin.

These various constructions call for the cooperation of various devices or systems for grouping elements which require a careful manufacture and accurate machining.

The object of the present invention is to provide an assembly made of a minimum of parts, simple of use, and not requiring elaborate fabricating means, and therefore at the same time simple and cheap to manufacture.

According to the invention, the pin comprises a tubular body formed at one end with a radial flange and at the other end with a conical portion in which two holes are formed allowing space for a locking device. The locking device is a pin made of single wire, coiled on one side and provided on the other side with two catches adapted to resiliently protrude outside the tube in the locked position and retract within the tube when placing the pin in position.

The present invention will become more apparent from the following description taken in conjunction with the accompanying drawings wherein:

FIG. 1 is a partial section and a partial elevation view of the connector in its inoperative conformation.

FIG. 2 shows the introduction of the connector in the hole of the parts being joined.

FIG. 3 is an elevational view of the pin set in position and locked.

FIG. 4 is an elevation view of the locking end of the pin, as seen in the direction of arrow F3.

FIG. 5 is a sectional view of said end on line V—V of FIG. 4 with locking catches partly retracted.

The illustrated connector comprises a tubular body 1 formed at its upper end with a radial flange 2 and with a central channel terminating at the same end with a frustoconical inner surface 3 widening outwardly. A similar frustoconical surface 14 is formed on the interior surface of the lower end of the tubular body.

Also at the lower end, the body 1 is formed with an outer surface in the form of a frustoconical portion 4 which provides easy engagement of the pin in the bore. Furthermore this lower end is diametrically slit axially inward to form open slots 5 as is shown in particular on FIG. 4. In addition there is formed in a perpendicular direction to slot 5 and inwardly from the end a hole 6 in which is lodged a small tubular sleeve 7.

The retaining pin is made of a metal wire having a double loop 8 centrally of its length and a pair of legs 9a and 9b constituting a resilient device constantly pushing radially backwards toward the outside. The legs 9a and 9b pass longitudinally through tube 1. The two legs 9a and 9b respectively end with a hook 10a, 10b bent upwards and towards the inside. Once the pin is put inside the tubular body 1, the tubular sleeve 7 is placed in hole 6 in order to prevent on the other hand the two legs 9a, 9b from crossing inwardly, which could cause the pin to come out of its housing in the body 1, and on the other hand to receive a safety pin 13 as shown on FIG. 4, preferably made of a metal wire.

When the connector is used to assemble two parts 11 and 12 formed with a hole, the loop 8 is first pulled in the direction of arrow F1 in order to partly retract hooks 10a, 10b inside slot 5 (this retraction movement is made easy by the frustoconical ramp 14 formed on the surface of tube 1). The connector assembly is then inserted in the holes of parts 11 and 12 in the direction of arrow F2, the rounded portion of the hooks allowing the hooks 5 to be completely retracted inside slot 5 (FIG. 2) by resting on the walls of the hole. When this operation is completed, i.e., the tubular body 1 completely inserted, the hooks 10a and 10b protrude resiliently towards the outside and the safety pin 13 is put into place. Removal of the connector is prevented so long as the pin 13 is in place.

To remove the connector it suffices only to remove the safety pin 13, and pull loop 8 in order to allow both legs 9a, 9b to partly retract towards the inside due to the frustoconical ramp 14. Immediately before complete retraction, the hooks have the configuration as shown on FIG. 5. By continuing pulling, the right hand side portion "p" of the hooks comes to rest on the inside edge "s" of the bore, thus allowing the hooks to completely retract; the connector is then in the configuration shown on FIG. 2.

It stands to reason that, without departing from the scope of this invention, it will be possible to modify the embodiment hereinabove described.

What I claim is:

1. Quick locking and unlocking connector for joining a plurality of members comprising a tubular body adapted to be removably inserted through a bore formed in the members to be connected and an operating member comprising a metal wire looped at its mid section to form a pull ring and two elongated legs extending therefrom, each leg ending with a hook curved upwardly and towards the inside, said operating member being removably inserted with said tubular body so that said pull ring abuts one end thereof and the hooks extending resiliently radially outward of the other end thereof, said tubular body being formed with a frustoconical ramp on its inner surface at said other end and said legs being formed with a bent portion cooperating with said ramp to partly retract said hooks towards the inside of said tubular body on removal of said member, said hooks being further formed with a rounded portion on its radial exterior followed by straight inwardly directed portion cooperating with the bore of the parts being assembled to completely retract said hooks towards the inside of said tubular body on movement of the tubular body through said bore.

2. The connector according to claim 1, wherein said tubular body is formed with a radially outwardly directed flange at said one end to limit insertion of said tubular body in said bore.

3. The connector according to claim 1, wherein said tubular body is provided with a pair of diametrically opposed slots extending axially from said other end to receive said hooks and permit radial retraction thereof.

4. The connector according to claim 1, including a diametric hole formed in the walls of said tubular body adjacent said other end, and a tubular sleeve adapted to fit within said hole, said sleeve preventing radial movement of said legs beyond the central axis of said body.

5. The connector according to claim 4, including a fastening member adapted to be received in said sleeve extending beyond the outer diameter of said tubular body to prevent axial removal of said body from said bore.

6. The connector according to claim 5, wherein said fastening member comprises a lockable safety pin.

7. The connector according to claim 2, wherein said tubular body is formed with an inwardly directed frustoconical outer surface at said other end to facilitate insertion thereof in said bore.

8. The connector according to claim 2, wherein said tubular body is formed with an outwardly directed frustoconical inner surface at said one end to facilitate insertion of said operating member therein.

* * * * *